Sept. 24, 1968     F. W. BARRY     3,402,726
ATTITUDE BIASED MACH SENSOR

Filed Jan. 20, 1966     3 Sheets-Sheet 1

INVENTOR.
FRANK W. BARRY
BY Norman Friedland
ATTORNEY

United States Patent Office 3,402,726
Patented Sept. 24, 1968

3,402,726
ATTITUDE BIASED MACH SENSOR
Frank W. Barry, Windsor, Conn., assignor to United
Aircraft Corporation, East Hartford, Conn., a corporation of Delaware
Filed Jan. 20, 1966, Ser. No. 521,884
5 Claims. (Cl. 137—15.2)

ABSTRACT OF THE DISCLOSURE

For an air inlet in a supersonic aircraft having variable geometry, means for varying the geometry of the air inlet in response to a signal which is a function of the ratio of two pressure signals, one of which signals is responsive to changes in the direction of the airstream.

---

This invention relates to Mach number sensors.

It is common practice in the air inlet art to schedule inlet geometry as a function of the local Mach number and the attitude of the inlet with respect to the airstream. Generally, the local Mach number and attitude are sensed by separate systems and the outputs of these systems combined in some manner to schedule inlet geometry. Patent No. 3,181,817, issued to M. Marcus et al., on May 4, 1965, discloses a system of this type. In that disclosure the local Mach number signal is compared with a scheduled signal generated by a three-dimensional cam as a function of attitude and inlet geometry. The difference between these signals schedules inlet geometry.

It is an object of this invention to simplify the heretofore known air inlet control systems by eliminating an entire sensing and signal developing system while still retaining its function.

It is a further object of this invention to eliminate the necessity of having two separate systems for sensing attitude and Mach number by using a local Mach number signal which is both a function of attitude and local Mach number.

It is a further object of this invention to provide a single signal for an air inlet system which is a function of the local Mach number and the attitude of the air inlet with respect to the airstream.

It is a further object of this invention to provide a Mach number probe which is designed to generate a Mach number signal which is biased by the attitude of the probe with respect to the airstream.

I have provided a Mach number sensing probe which generates a Mach number pressure ratio signal $P_t/P_s$ which varies with airstream Mach number and which is biased by the attitude of the probe with respect to the airstream. This is accomplished by positioning either the static pressure tap or the total pressure tap so that the signal received by that tap varies as a function of attitude.

My invention may be better understood by reference to the accompanying drawings in which.

Figure 1:
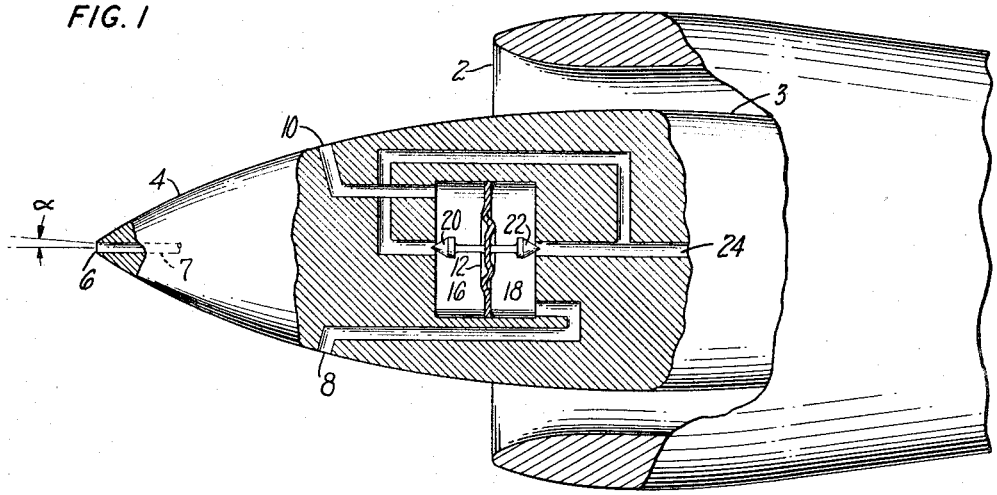
FIGURE 1 is a top view, partial schematic, of an axially-symmetrical variable-geometry supersonic air inlet.

FIGURE 1 shows an air inlet generally indicated by numeral 2 which is axially symmetrical and which has a movable spike 3 which is effective to vary the inlet geometry as the spike translates. The forward portion of the spike 3 forms a sensing probe 4 which has a Pitot pressure ($P_t$) tap 6 at its forward edge for sensing the airstream Pitot pressure. This pressure is transmitted to line 7. This tap is almost completely insensitive to changes in the attitude of the inlet with respect to the airstream. Two static pressure ($P_s$) taps 8 and 10 are located on opposite sides of the probe. The pressures sensed by these taps are transmitted to opposite sides of the diaphragm 12 which separates chambers 16 and 18. Poppet valves 20 and 22 rigidly coupled to and movable with diaphragm 12 connect either the pressure in chamber 16 or 18 with line 24 depending on the pressure difference across the diaphragm. When the pressure sensed by tap 10 is greater than the pressure sensed by tap 8 poppet valve 20 will connect chamber 16 to line 24 while poppet valve 22 will be closed. When the pressure sensed by tap 8 is greater than the pressure sensed by tap 10 the valve 22 will open and the valve 20 will be closed. Thus, the higher of the two pressures sensed by taps 10 and 8 will be transmitted to line 24.

Figure 2:
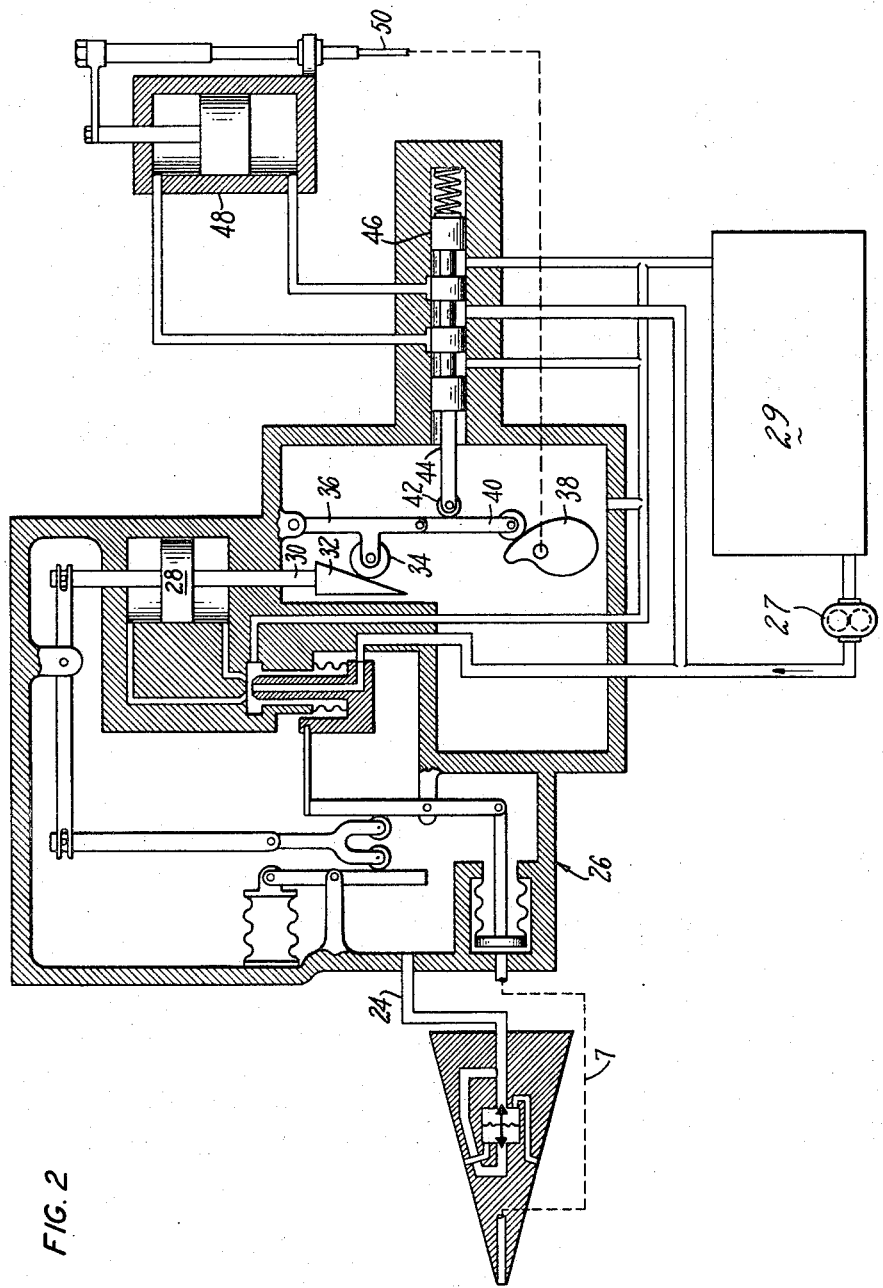
FIGURE 2 is a partial schematic of the control for the air inlet shown in FIGURE 1.

Reference is now made to the FIGURE 2 which is a partial schematic of the control for the air inlet. This control is usually remotely located from the air inlet and the local Mach sensor. Lines 7 and 24 transmit pneumatic signals indicative of the airstream Pitot pressure ($P_t$) and the biased static pressure ($P_s$) respectively to the pressure ratio sensor generally indicated by numeral 26. This type of pressure ratio sensor is well known in the art and is designed so that the position of piston 28 and rod 30 is indicative of the pressure ratio $P_t/P_s$ when the linkage is in equilibrium. A detailed description of this type of pressure ratio sensor can be found in Patents Nos. 3,181,-817 and 3,045,500. Hydraulic fluid under pressure is supplied to the control by a hydraulic system which is shown in simplified form. This system includes a high pressure pump 27 and a reservoir 29. Rod 30 positions a two-dimensional cam 32, the output of which is a schedule of spike position as a function of pressure ratio $P_t/P_s$. The scheduled spike position is transmitted through roller 34 to link 36. The spike feedback cam 38 positions link 40 as a function of the actual spike position. The linkage 36 and 40 is designed so that the position of the roller follower 42 is indicative of the difference between the scheduled spike position as generated by cam 32 and the actual spike position as generated by cam 38. Rod 44 connects roller 42 with the pilot valve 46. This pilot valve positions a remote spike actuator 48 as a function of the input signal to roller 42. The spike actuator is directly connected to the spike 3. A spike feedback cable 50 rotates the spike feedback cam as a function of spike position.

When the angle α formed by the airstream and the probe in the plane of the static pressure taps 8 and 10 is varied the pressure sensed by the windward tap which is being transmitted to the air inlet control will vary also. Thus, the scheduled spike position will be biased as a function of the angle α.

Figure 3:
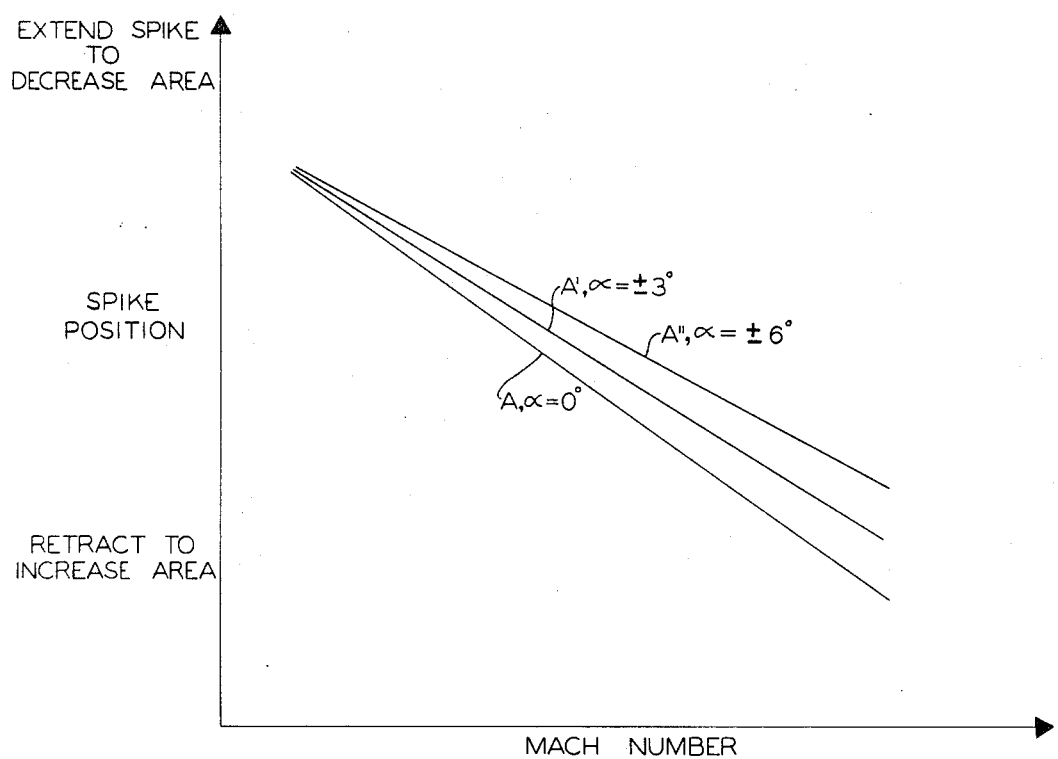
FIGURE 3 is a graphical representation of scheduled spike position versus Mach number as biased by an attitude signal.

FIGURE 3 represents the scheduled spike position versus Mach number characteristic as biased by flow direction. Curve A represents the scheduled spike position versus Mach number characteristic for the inlet when the angle between the airstream and the center line of the inlet α is zero. Curves A′ and A″ represent the biased schedule as the angle α increases. The effective local Mach number signal will be reduced as the angle α increases.

The geometry of the probe determines the characteristics of curves A′ and A″. The geometry is generated to meet the inlet requirements for the particular application on which the probe will be used.

Figure 5:
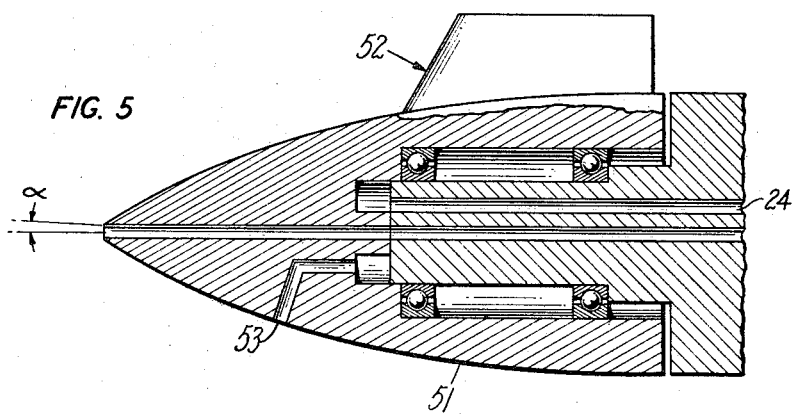
FIGURE 5 is the top view of another probe embodying my invention which can be adapted to the schematic shown in FIGURE 2.

FIGURE 5 shows a modification of my invention which provides a Mach signal biased as a function of the airstream direction in any plane. A conical probe 51 which is freely rotatable about its axis is substituted for the probe shown in FIGURE 1. A single static tap 53 is located on one side of the probe and a direction vane 52 is located on the other side of the probe either in the same plane as the static tap 53 or somewhat offset depending on the sensitivity desired. The vane will cause the probe to rotate and keep the static tap on the windward side of the probe. Although not shown here other means can be used to rotate the probe to maintain the tap to windward.

Figure 4:
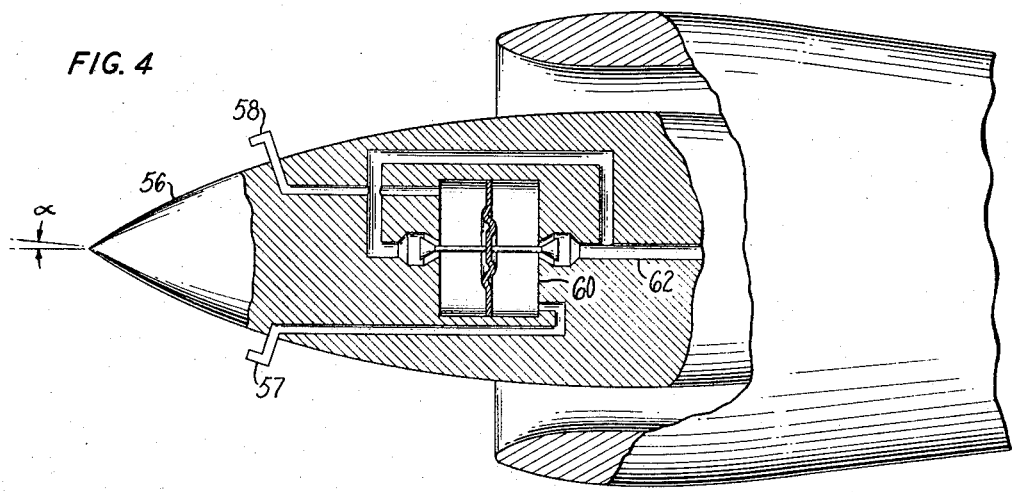
FIGURE 4 is a top view of an alternate probe which may be used in place of that shown in FIGURE 1.

FIGURE 4 shows another embodiment of my invention. In this configuration the total pressure signal $P_t$ rather than the static pressure signal is varied as a function of attitude. A probe 56 is substituted for the probe shown in FIGURE 1. Two total pressure sensors 57 and 58 are used in conjunction with valve 60 to transmit a pressure signal through line 62 which is the lower of the two total pressures sensed. As in the embodiments described above the signal pressure will vary as a function of the angle between the airstream and the pressure sensor. By using the lower of the two total pressure signals the characteristics for this embodiment will be the same as shown in FIGURE 3. A static pressure signal which is not sensitive to changes in attitude is obtained from another source for this embodiment.

Although I have shown the probe at the tip of the spike it could be at other locations on the airframe depending on the particular application. The geometry of the probe will also vary with the particular application. For instance, the probe might be wedge, cone, spherical or other appropriate shape depending on the application and on whether or not the system is required to compensate for attitude changes in more than one plane.

It will also be apparent to one skilled in the art that other combinations of airstream pressures could be used such as total pickups as long as the ratio is indicative of Mach number.

Thus, my invention is described by way of illustration rather than limitation and accordingly it is understood that my invention is to be limited only by the appended claims taken in view of the prior art.

I claim as my invention:

1. An air inlet system for aircraft power plants comprising:
    an air inlet duct having variable geometry;
    a first pressure pickup for generating a first signal which is a function of the dynamic pressure of an airstream entering said air inlet duct;
    means for sensing a pressure which varies with the attitude of the air inlet duct relative to the air stream direction including means for seeking the highest pressure so sensed at any given time to produce a second signal;
    means for generating a control signal which is a function of the ratio of said first and second signals; and
    means for varying the geometry of said inlet duct in response to said control signal.

2. An attitude biased Mach number sensing system for an airstream comprising:
    a body having a tapered portion facing into the airstream;
    two pressure sensing pickups located on opposite sides of the tapered portion of said body;
    pressure responsive means for selecting and communicating as a first pressure signal one of the pressures sensed by said pickups;
    means for generating a second airstream pressure signal which is insensitive to the direction of the airstream; and
    means for generating a control signal which is a function of the ratio of the first and second pressure signals.

3. An attitude biased Mach number sensing system for an airstream as defined by claim 2 wherein:
    the pressure sensing pickups located on said body are static pressure sensing orifices;
    said pressure responsive means selects the higher of the pressures sensed by said pressure sensing pickups; and
    said means for generating a second pressure signal is a Pitot probe located in the airstream so as to be insensitive to the direction of the airstream.

4. An attitude biased Mach number sensing system for an airstream as defined by claim 2 wherein:
    the pressure sensing pickups located on said body are Pitot probes facing the smaller end of said tapered body; and
    said pressure responsive means selects the lower of the two pressures sensed by said pressure sensing pickups.

5. An attitude biased Mach number sensing system for an airstream comprising:
    a probe mounted in the airstream and rotatable about an axis parallel to the airstream, said probe having a tapered outer surface facing the airstream;
    a pressure pickup mounted on the surface of said probe for generating a first airstream pressure signal;
    means for rotating said probe as the direction of the airstream changes so as to maintain a constant circumferential angle between said pressure pickup and the windward side of said probe;
    means for generating a second airstream pressure signal which is insensitive to the direction of airstream; and
    means for generating a control signal which is a function of the ratio of the first and second pressure signals.

References Cited
UNITED STATES PATENTS

| | | | |
|---|---|---|---|
| 2,995,892 | 8/1961 | Kosson | 137—15.2 |
| 3,046,729 | 7/1962 | Petren | 244—53.8 X |

ALAN COHAN, *Primary Examiner.*